(12) United States Patent
Grayson

(10) Patent No.: US 6,840,275 B2
(45) Date of Patent: Jan. 11, 2005

(54) VARIABLE-GRAVITY ANTI-VORTEX AND VAPOR-INGESTION-SUPPRESSION DEVICE

(75) Inventor: Gary D. Grayson, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/438,690

(22) Filed: May 15, 2003

(65) Prior Publication Data

US 2003/0196705 A1 Oct. 23, 2003

Related U.S. Application Data

(62) Division of application No. 09/957,859, filed on Sep. 21, 2001, now Pat. No. 6,591,867.

(51) Int. Cl.[7] .............................. B64D 37/20; F15D 1/00
(52) U.S. Cl. ..................... 137/590; 137/561 A; 137/574
(58) Field of Search .............................. 137/590, 561 A, 137/574, 14

(56) References Cited

U.S. PATENT DOCUMENTS

| | | | |
|---|---|---|---|
| 4,272,257 A | 6/1981 | Ellion et al. ................. | 210/488 |
| 4,595,398 A | 6/1986 | Orton et al. .................... | 55/182 |
| 4,715,399 A | 12/1987 | Jaekle, Jr. et al. .......... | 137/209 |
| 4,733,531 A | 3/1988 | Grove ........................ | 137/590 |
| 4,743,278 A | 5/1988 | Yeh ............................. | 137/154 |
| 4,901,762 A | 2/1990 | Miller, Jr. et al. .......... | 137/590 |
| 5,279,323 A | 1/1994 | Grove et al. ................. | 137/574 |
| 5,293,895 A | 3/1994 | Grove et al. ................. | 137/154 |
| 5,427,334 A | 6/1995 | Rauscher, Jr. ............ | 244/135.1 |
| 5,901,557 A | 5/1999 | Grayson ..................... | 62/45.1 |
| 6,014,987 A | 1/2000 | List et al. .................... | 137/590 |

OTHER PUBLICATIONS

Dieter K. Huzel and David H. Huang, "Modern Engineering for Design of Liquid–Propellant Rocket Engines", American Institute of Aeronautics and Astronautics, 1992, pp. 300–304.

*Primary Examiner*—A. Michael Chambers
(74) *Attorney, Agent, or Firm*—Harness Dickey & Pierce P.L.C.

(57) ABSTRACT

A liquid propellant management device for placement in a liquid storage tank adjacent an outlet of the storage tank to substantially reduce or eliminate the formation of a dip and vortex in the liquid of the tank, as well as prevent vapor ingestion into the outlet, as the liquid drains out through the outlet. The liquid propellant management device has a first member adapted to suppress the formation of a vortex of a liquid exiting the storage tank. A plate is affixed generally perpendicular to the first member, wherein the plate is adapted to suppress vapor ingestion into the outlet by reducing a dip in a surface level of the liquid leaving the tank. A second member is affixed to the second side of the plate. The second member ensures that the plate is wet with liquid and assists in positioning bubbles away from the outlet.

6 Claims, 6 Drawing Sheets

VARIABLE-GRAVITY ANTI-VORTEX AND VAPOR-INGESTION-SUPPRESSION DEVICE

CROSS-REFERENCE TO RELATED APPLICATIONS

This application is a divisional of U.S. patent application Ser. No. 09/957,859 filed on Sep. 21, 2001 now U.S. Pat. No. 6,591,867. The disclosure of the above application is incorporated herein by reference.

FIELD OF THE INVENTION

The present invention relates to anti-vortex and vapor-ingestion-suppression devices, and more particularly to an anti-vortex vapor-ingestion-suppression device that works in various gravity environments.

BACKGROUND OF THE INVENTION

Many space vehicles, generally use a liquid propellant which is stored in storage tanks and fed into engines during take off and flight in space. The liquid must be moved from the storage tanks to the engine in an efficient manner. First, vapor or gas cannot be allowed to enter the engines in any great amount or too early in the ignition process. If gas is introduced into the engines, it may cause a stall or other malfunctioning of the engine that may increase the possibility of engine failure. It is generally known in the art to provide a device that is be placed in the propellant storage tanks which will reduce the acquisition of gas into the engine. Second, it is desirable to empty the storage tanks as completely as possible during an engine burn and flight to reduce re-entry weight and increase vehicle payload. Typically, a portion of liquid propellant still remains in the tank, thereby increasing the vehicle weight and reducing the maximum payload of the vehicle.

One solution to vapor ingestion is to provide a screen that encompasses the interior area of the tank or at least a portion thereof. Therefore, fluid is wicked through the screens by capillary action, and vapor or gas bubbles are prevented from flowing through the screens by the bubble point pressure of the fluid screen system. Screen systems are made most advantageous only for storage tanks being used in low gravity and are less useful in environments where significant gravity is present. Additionally, the screen systems typically cannot be used with certain liquid propellants such as hydrogen peroxide due to material incompatibility between $H_2O_2$ and typical screen materials. The increased surface area of the screens adds more area for chemical reactions where the liquid propellant may decompose.

Other systems provide vanes extending a distance from the sump of the tank towards the walls of the storage tank. These vanes help bring liquid propellants to the outflow area of the storage tank through capillary action. Furthermore, the vanes help reduce the ingestion of gas bubbles into the engine of the vehicle. The vanes used in known vapor ingestion suppression systems, however, are for very low flow rates and cannot provide substantial vapor ingestion suppression at the higher flow rates of many reusable space craft.

Thus, the generally known anti-vapor ingestion systems include several drawbacks. Additionally, known systems allow too much fuel to be left in the storage tanks thereby decreasing the efficient use of the fuel stored in the tanks and decreasing the payload for a similarly sized tank and vehicle. Additionally, the known systems increase the breakdown of certain propellant fluids into gas and non-fuel or inert substances. Therefore, there is a need in the art for a device that will allow for anti-vortexing of the fuel as it leaves the tank, and to increase ingestion of liquid propellant into the sump and outlet, thereby increasing the efficiency of the storage tanks and decreasing the possible ingestion of gases.

SUMMARY OF THE INVENTION

In a first preferred embodiment of the present invention, a storage vessel has an outlet and a liquid propellant management system adjacent the outlet. The liquid propellant management system reduces a dip and a vortex of a liquid, which reduces vapor ingestion into the outlet of the tank in both high gravity environments and low gravity environments. The liquid propellant management system has a first vane with bores, a first end a second end. A plate is also included with bores having a first side and a second side where the first side is operably associated with the first vane. The system also has a second vane operably associated with the second side of the plate. The first vane is adapted to substantially reduce a vortex of a liquid. The plate substantially reduces a dip of a liquid due to frictional energy dissipation, and the second vane provides frictional energy dissipation and substantially wets the plate with a liquid in the tank.

In a second preferred embodiment of the present invention, a liquid propellant management device for use in a liquid storage tank has a first member to suppress the formation of a vortex in a liquid exiting the tank. A plate operably associated with the first member is also included to substantially reduce vapor ingestion into the outlet of the tank. A second member is also included and operably associated with the plate to wet the plate with liquid stored in the tank and provide additional energy dissipation via friction.

In a third preferred embodiment of the present invention, a liquid storage tank is disclosed which has at least an outlet and a liquid management device. The liquid management device has a vortex suppression vane with a plate, to reduce ingestion of vapor, affixed to the top of the vortex suppression vane. Also, a bubble positioning vane is affixed atop the plate. The vortex suppression vane suppresses vortices that attempt to form in liquids as they are exiting the liquid storage tank. The plate reduces the dip due to frictional energy dissipation as the liquid attempts to exit the tank. The bubble positioning vane works to ensure that the plate is wet with liquid at all times during emptying of the liquid storage tank. It also helps to position the bubbles away from the outlet to ensure that ingestion of gas into the outlet is non-existent or minimal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
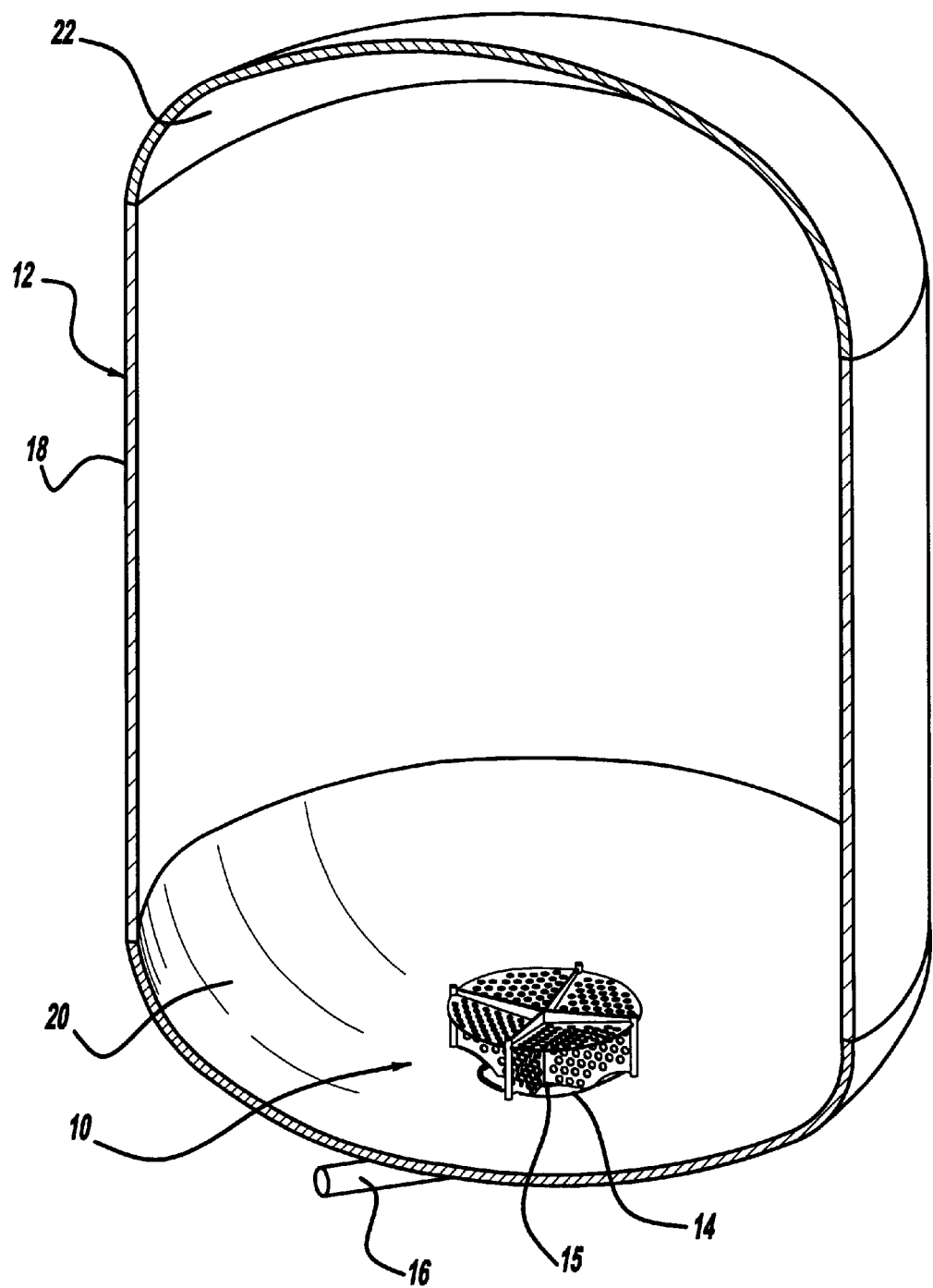
FIG. 1 is a perspective, cross-sectional view of a tank including a liquid management device according to a first preferred embodiment of the present invention.

With reference to FIG. 1, a liquid management device or an anti-vortex/vapor-ingestion-suppression device (AVVIS) 10 is shown in accordance with a preferred embodiment of the present invention. The AVVIS 10 operates in variable gravity environments and is affixed within a tank 12 near a sump 14 of tank 12. Sump 14 includes an outlet port 15. Extending externally from tank 12 and connected to outlet port 15 is an outlet line 16. Tank 12 generally has a cylindrical wall 18 extending between a tank bottom 20 and a tank top 22. It will be understood, however, that tank 12 may be any shape suitable for the intended application. Tank 12 is a liquid storage tank where the liquid stored therein exits through sump 14 and outlet port 15 and into outlet line 16. Tank 12 is generally pressurized or has a higher pressure relative to outlet line 16. The higher pressure of tank 12 helps to ensure that fluid in tank 12 exits through outlet line 16 to its intended destination. Tank 12 forms a storage tank for a vehicle, and the liquid stored in tank 12 is generally a liquid propellant, particularly a fuel or oxidizer. The outlet line 16 leads to an engine which uses the liquid propellant stored in tank 12 for powered flight. Generally, fuels include high grade hydrocarbons, such as kerosene, and oxidizers include liquids such as hydrogen peroxide.

Figure 2:
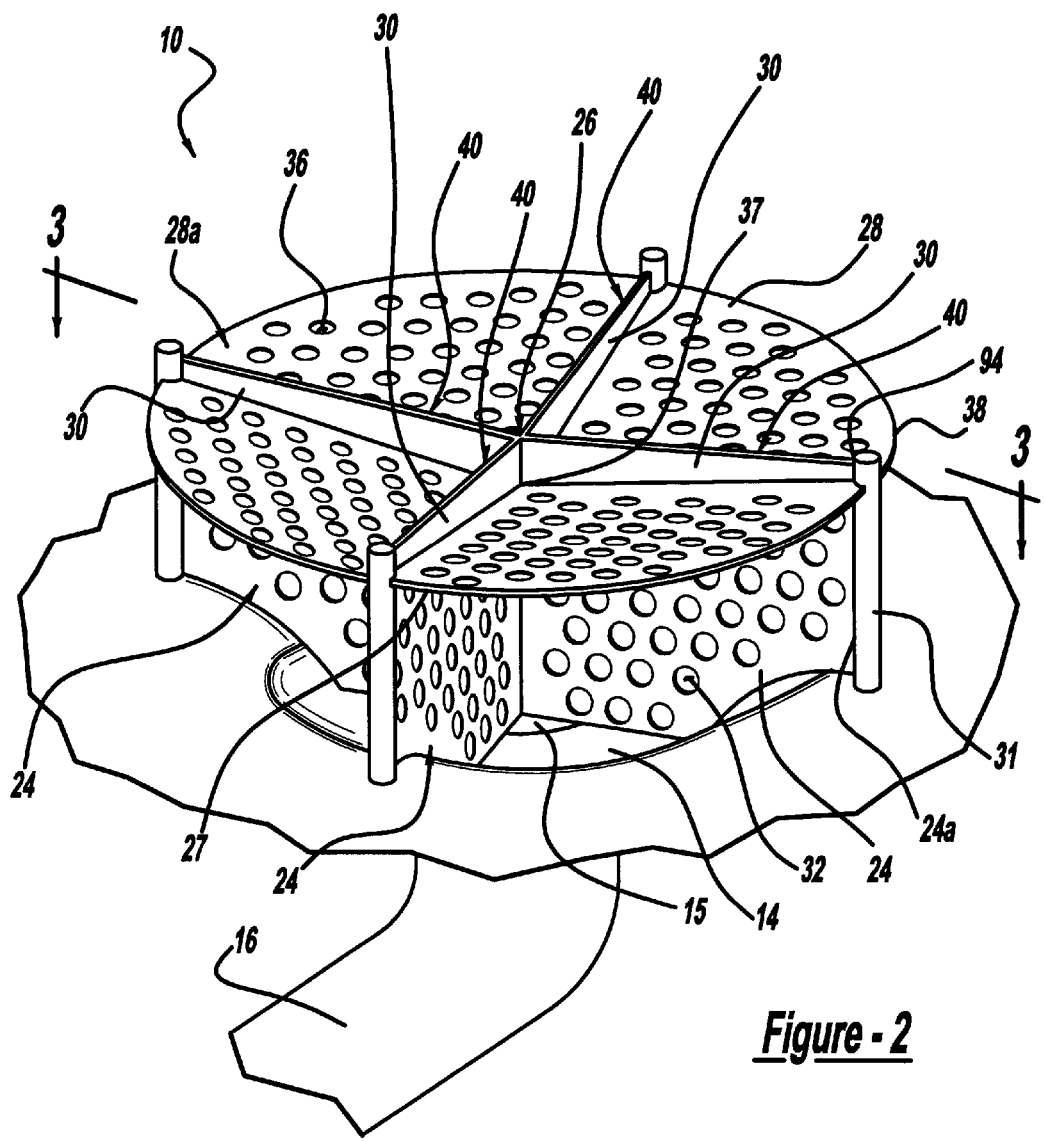
FIG. 2 is an enlarged perspective view of the liquid management device in the storage tank shown in FIG. 1.

With continuing reference to FIG. 1 and further reference to FIG. 2, AVVIS 10 generally includes four vanes 24 which meet at a center or interconnection area 26. Interconnection area 26 is generally directly above outlet port 15. Resting on a top edge 27 of each of vanes 24, and affixed to the top edges 27 of the vanes 24 by any appropriate means, is a plate 28. Extending from a top surface 28a of plate 28 and generally coplanar with vanes 24 are bubble positioning vanes 30. Bubble positioning vanes 30 also meet each other at the intersection area 26. At the outside terminus 24a of each vane 24 is a post 31 to which the associated vane 24 is affixed. Each vane 24 is affixed to its respective post 31 through any suitable means such as spot welding or adhering material. Posts 31 are then mounted to sump 14, again by any appropriate fastening or adhering means. The posts 31 may each be press fitted into associated bores, formed in sump 14, or they may also be welded to position the AVVIS 10 directly over the outlet port 15. In this way, AVVIS 10 is precisely affixed to sump 14 so that it does not move during operation.

Each vane 24 includes a plurality of vane bores 32. Vane bores 32 have an exemplary diameter of preferably about 0.2 inches (5.08 mm) to about 0.5 inches (12.70 mm). Vane bores 32, however, may have any diameter that is suitable to the particular application for which the AVVIS 10 is used. Additionally, vane bores 32 are formed in a pattern on each vane 24 that is generally nested. The pattern is one similar to any nested pattern of circles or spheres simply spaced apart by a distance between the centers of between about 0.6 inches (15.24 mm) and about 0.8 inches (20.32 mm). Again, it will be understood by those skilled in the art, that vane bores 32 may be separated by any distance suitable to the application to which the AVVIS 10 is put. Generally, it is desirable to size and position vane bores 32 such that each vane 24 is about 20% to about 40% porous.

Figure 3:
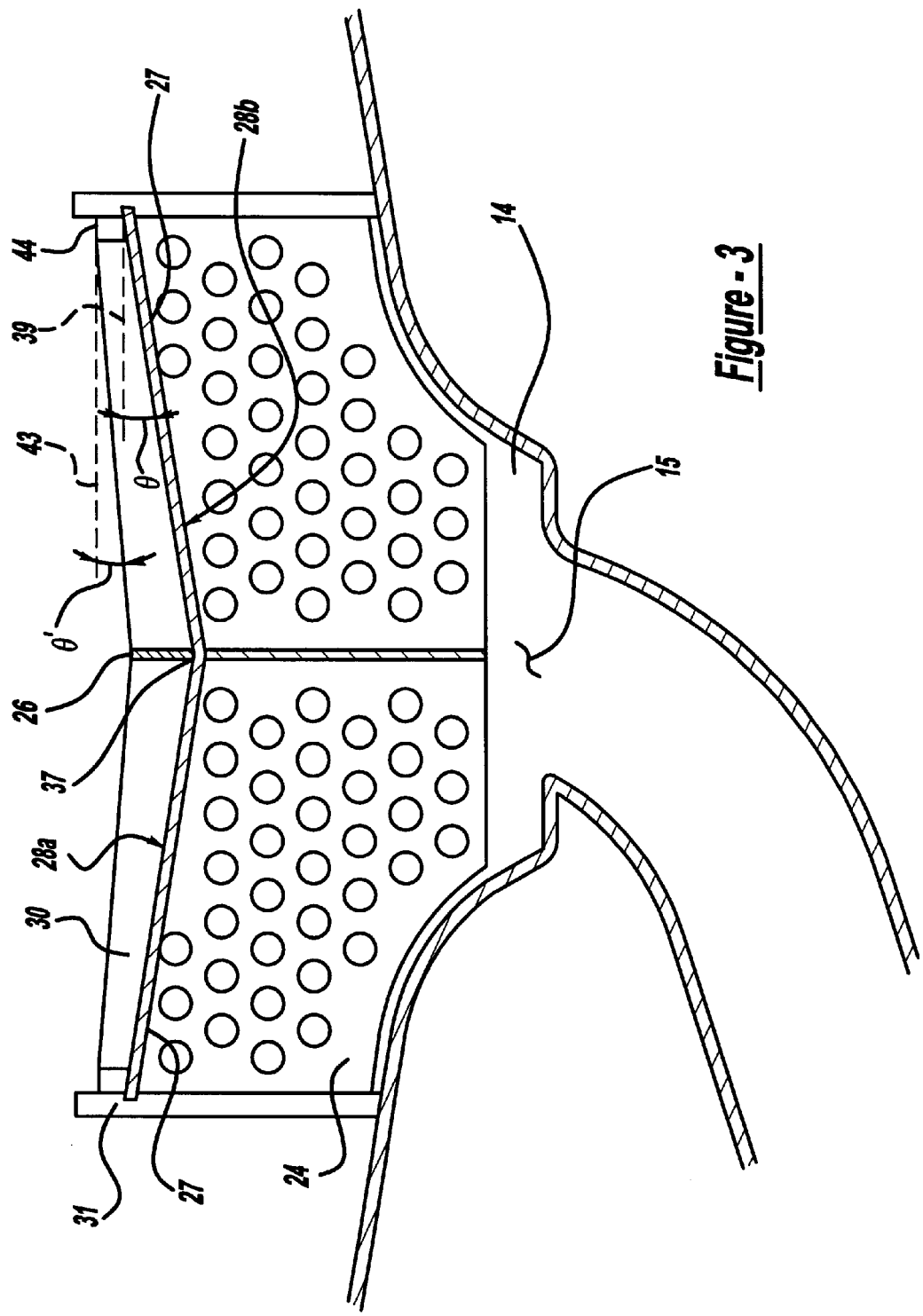
FIG. 3 is a cross-sectional view taken along line 3—3 of FIG. 2.

Referring to FIGS. 2 and 3, vanes 24 are placed in at an angle of preferably about 85 to about 95 degrees to each other and form the body or main support structure of AVVIS 10. Plate 28 includes a plurality of plate bores 36. Plate bores 36 are generally similar to vane bores 32 such that vanes 24 and plate 28 may be formed from a single piece of starting sheet material. Plate 28 may either be a single piece or may be formed from a plurality of sections affixed to the top edge 27 of vanes 24 in between two adjacent vanes 24. Plate 28 also forms a cone having a vertex or center 37 coinciding with and adjacent interconnection area 26. The cone formed by plate 28 has a directrix formed by an outer perimeter 38 of plate 28. The angle 2 of plate 28 (FIG. 3) from the outer perimeter 38 to the interconnection area 26 preferably is about negative 5 to about negative 15 degrees from a plane 39 extending perpendicular to post 31 and bisecting the outer perimeter 38. The vertex 37 of plate 28 is below the outer perimeter 38 of plate 28, thus the reason for the negative angle. It will be understood that the angle may also be designated positive if viewed from the plane of the vertex 37.

The bubble positioning or wicking vanes 30 extend from the top surface 28a of plate 28. Bubble positioning vanes 30 are substantially solid and do not generally include bores. It will be understood that bubble positioning vanes 30 need not be coplanar with vanes 24 nor be equal in number to vanes 24. Bubble positioning vanes 30 have top edges 40 that each extend at an angle 2N (FIG. 3) from a plane 43 extending perpendicular to, and bisecting, an outside edge 44 and parallel to its associated post 31, towards the intersection area 26. Angle 2N is preferably between about negative 3 degrees to about negative 15 degrees. Again, the portion of bubble positioning vane 30 near intersection area 26 is lower than the portion near outer perimeter 38, therefore the negative degrees. It will be understood that the degrees are positive if viewed from the plane of the portion of the bubble positioning 30 vane near intersection area 26.

Figure 4:
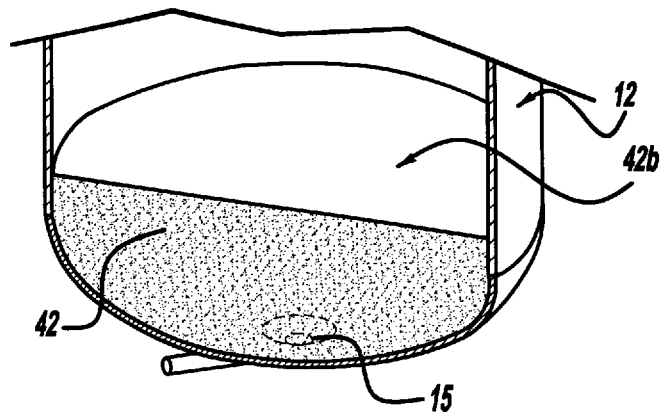
FIG. 4 is a fragmentary view of a liquid storage tank including a volume of liquid.
Figure 4A:
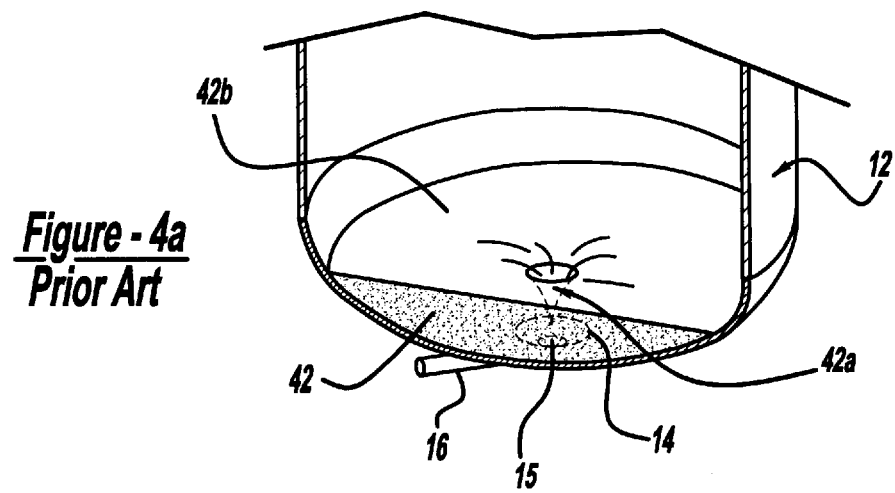
FIG. 4a is a fragmentary view of a liquid storage tank including a volume of liquid being withdrawn therefrom.
Figure 4B:
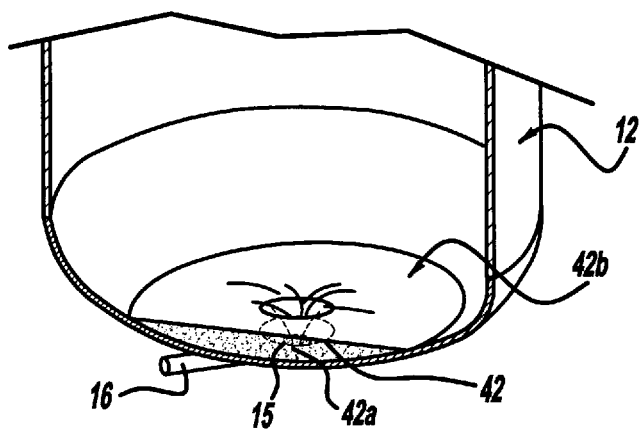
FIG. 4b is a fragmentary view of a liquid storage tank with a residual volume of a liquid still held therein.

With reference to FIGS. 4 through 4b, tank 12 is shown to contain a liquid 42 and no liquid propellant management device to reduce a dip 42a in the upper surface level 42b of the propellant attempting to exit tank 12. Here gas may be ingested into outlet port 15 and moved through outlet line 16. The initial dip 42a is produced by inertia forces due to draining of the tank. However, gas bubbles are more buoyant and attempt to float up, which is in a direction opposite the inertia of the fluid moving out of tank 12 through sump 14. Therefore, this buoyancy to inertia effect initially creates dip 42a and is increased by the vortex motion of the liquid 42 as it attempts to exit through the outlet port 15. Dip 42a, increased in size by a vortex, increases the likelihood of the ingestion of gas into outlet line 16. When there is enough liquid 42 in tank 12, as shown in FIG. 4, no dip 42a is present. However, as the liquid 42 empties out of tank 12, dip 42a begins to form, as shown in FIG. 4a. The bottom of dip 42a grows ever nearer outlet port 15 as more and more liquid 42 is removed from tank 12. Finally, as shown in FIG. 4b, dip 42a enters outlet port 15 thereby allowing ingestion of gas into outlet port 15 and outlet line 16. When gas is ingested into outlet line 16, it may cause the engine to stall.

Generally, gas in a propellant tank comes from the tank pressurization system. However, with propellants like $H_2O_2$, the liquid can decompose into gaseous components. Cryogenic liquids also generate gas when heated due to low boiling points. Furthermore, when liquid 42 is removed several times from tank 12 several successive dips 42a are formed. Each of these successive dips creates a chance for gas to be introduced into the tank 12. The amount of liquid 42 left in tank 12 when dip 42a enters sump 14 is called the "residual volume".

AVVIS 10 may be formed from a wide variety of suitable materials including plastics, composite materials, or metals and metal alloys. Whatever material the device is fabricated from, it must be prepared for use with the intended propellant. This includes pacification and cleaning for oxidizers, such as $H_2O_2$. The pacification of the material helps to reduce the reactivity of the material with the liquid 42 in tank 12 especially, if the liquid comprises hydrogen peroxide. If the liquid is hydrogen peroxide, screens or larger devices would increase the rate of break down of the hydrogen peroxide into water and oxygen gas. Neither water nor gaseous oxygen are proper propellants for an engine plus they increase the tank gas pressure possibly requiring venting of the tank to keep it within its structural limits. Therefore, it is necessary to substantially eliminate the breakdown of the propellant.

AVVIS 10 also has a relatively small surface area that takes up only a small portion of the internal volume of tank 12 and does not provide a significant surface area for the breakdown of hydrogen peroxide. Generally, AVVIS 10 is no larger in diameter than sump 14, which in turn is preferably only about 20% of the diameter of tank 12. AVVIS 10 also has a height of preferably about one-half its diameter, but the actual dimensions depend on the application. It is to be understood, however, that AVVIS 10 may be used with any liquid propellant that must be stored in tank 12 before it is removed.

Figure 5:
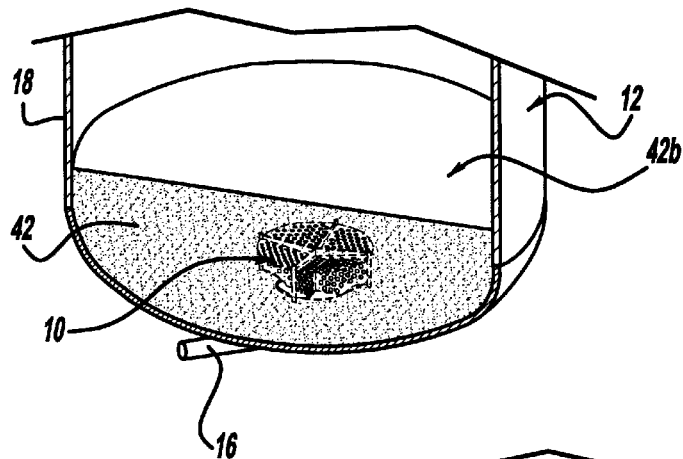
FIG. 5 illustrates a partial cross-sectional view of a liquid storage tank holding a volume of liquid, and having the liquid management device according to the present invention installed.
Figure 5A:
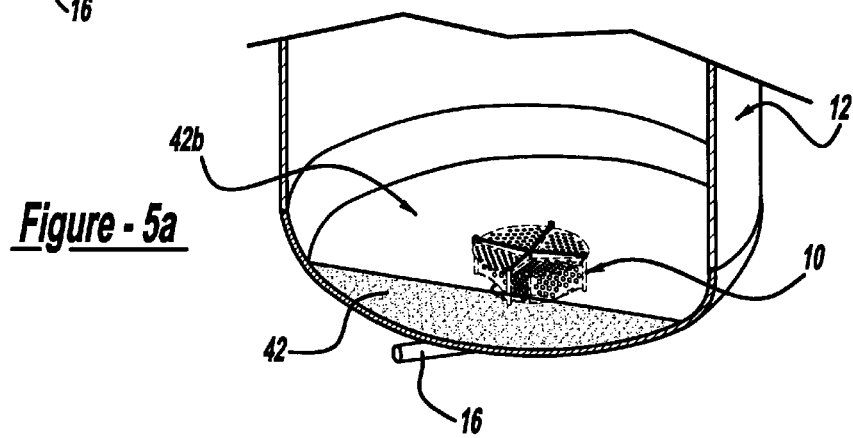
FIG. 5a illustrates the liquid storage tank of FIG. 5 having a volume of liquid extracted.
Figure 5B:
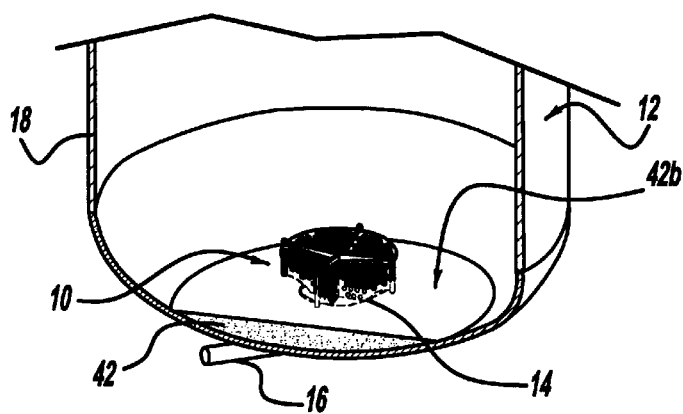
FIG. 5b illustrates the liquid storage tank of FIG. 5 with a residual volume of liquid.

With reference to FIGS. 5 through 5b, AVVIS 10 provides a means to reduce the residual volume of liquid 42 left in tank 12 after attempting to empty tank 12 either through a propellant dump or through an engine burn. Generally, tank 12 is pressurized to a pressure of about 70–85 pounds per square inch (psi). Plate 28 acts as a vapor ingestion suppression mechanism that initially reduces the downward motion of the gas liquid interface 42b to form dip 42a. As the bottom of dip 42a reaches plate 28, the friction on plate 28 removes the kinetic energy of the liquid gas interface thereby flattening or reducing dip 42a formed in the liquid. The liquid 42 flows through plate bores 36 reducing the kinetic energy thereof. Plate bores 36 increase the interaction of plate 28 with liquid 42 thereby increasing the effectiveness of plate 28 to reduce the kinetic energy of the liquid 42. Vanes 24 reduce the vortex formed by the liquid 42 as it attempts to leave tank 12. Vanes 24 reduce the momentum of liquid 42 as it enters sump 14. Vane bores 32 also increase the interaction of vanes 24 with liquid 42 to help reduce the momentum of the liquid 42. Additionally, vane bores 32 allow the liquid 42 to flow through vanes 24 as opposed to around the vanes 24. As the liquid 42 flows through vanes 24, the momentum of the liquid 42 is reduced to a greater degree than if the liquid 42 was forced to flow around vanes 24 due to frictional energy dissipation. Additionally, if the liquid 42 was not allowed to flow through vanes 24, additional mini-dips might be created between each of the vanes 24. As vanes 24 reduce the vortex in the liquid 42, dip 42a becomes less pronounced. Therefore, vanes 24 work in conjunction with plate 28 to resist ingestion of gas into outlet line 16. Plate 28 initially reduces dip 42a while vanes 24 reduce the vortex force so that the vortex force cannot enhance the dip 42a.

The residual volume that is not able to be removed from tank 12 and must be accounted for or it may adversely affect a vehicle which attempts to reenter the earth's atmosphere. Therefore, the residual volume reduces payload that can be carried by a vehicle. With reference to FIGS. 4 to 4b, the progression of liquid 42 being removed from tank 12 is shown without AVVIS 10. As the liquid 42 is removed from tank 12, dip 42a becomes enlarged. At the time shown in FIG. 4b, dip 42a becomes so great that gas is being, or will be, ingested into outlet port 15 rather than liquid 42 alone. At this point, no more liquid 42 can be safely removed from tank 12 without causing an adverse reaction in the engine. Therefore, FIG. 4b shows an example of a "residual volume" that is left in tank 12 when AVVIS 10 is not present. Generally, the "residual volume" in tanks with no AVVIS 10 device is between about 3% and 6% of the total capacity of the tank 12.

When AVVIS 10 is present, in a tank similarly sized and shaped as one shown in FIGS. 4 through 4a, residual volumes in tank 12 are generally no more than between about 0.5% to about 1%. FIGS. 5 through 5b, show a progression similar to what is shown in FIGS. 4 through 4b. However, due to the presence of AVVIS 10, the dip 42a is not present or is greatly reduced. The interaction of AVVIS 10 with the liquid 42 being removed from tank 12 reduces or eliminates the dip such that it does not significantly affect the removal of the liquid from tank 12. Therefore, the residual volume left in the tank 12 is greatly reduced which enhances the efficiency of tank 12. Though a small residual volume may still be present in tank 12 to ensure that no gas is ingested through outlet line 16, the residual volume is about three times less than the residual amount of propellant left in tank 12 when no AVVIS 10 is present.

Bubbles are capsules of gas surrounded by liquid 42 in tank 12. The formation of bubbles may be through any number of mechanisms described above. The cone shape of plate 28 helps position the bubbles away from sump 14. In a liquid environment, since a bubble is more buoyant it will tend to flow upward towards plate 28 out of sump 14. Once it encounters plate 28, it will then move along the angled under portion 28b (FIG. 3) of plate 28 which is directed away from sump 14. Since a bubble will always tend to move up from the sump 14, angle 2 of plate 28 will ensure that it moves out of sump 14 as well. If plate 28 were flat, the bubble would only move up to the plate and then stop. A flat plate would hold the bubble in place. Due to the angle 2 of plate 28, the bubble moves away from and further out of the sump 14.

Bubble positioning vanes 30 act as wicking and bubble placement vanes. In a low acceleration or low gravity environment, capillary forces of the liquid 42 force it into the interface of bubble positioning vanes 30 and plate 28, thereby keeping plate 28 wet with liquid 42. The capillary forces created on bubble position vanes 30 ensure that liquid 42 remains near the sump 14. If bubble positioning vanes 30 are not present to provide such capillary forces in low acceleration environments, liquid 42 would be more likely to move away from sump 14 and up walls 18 of tank 12. Additionally, bubble positioning vanes 30 help to ensure that bubbles are positioned away from sump 14, especially large bubbles formed on the top surface 28a of plate 28. Sump 14 is below AVVIS 10 whereas larger bubbles formed in tank 12 would first encounter top surface 28a of plate 28 before entering sump 14. Bubble positioning vanes 30 help move the bubbles away from sump 14 in a similar fashion, as does plate 28 for bubbles formed in sump 14. Again, as bubbles are buoyant, they tend to move up and, due to the angle 2' of bubble positioning vanes 30, bubbles will tend to move up and away from the sump 14 towards the outer perimeter 38. This helps to ensure a reduction or a non-ingestion of gas vapor from the bubbles into sump 14.

Figure 6:
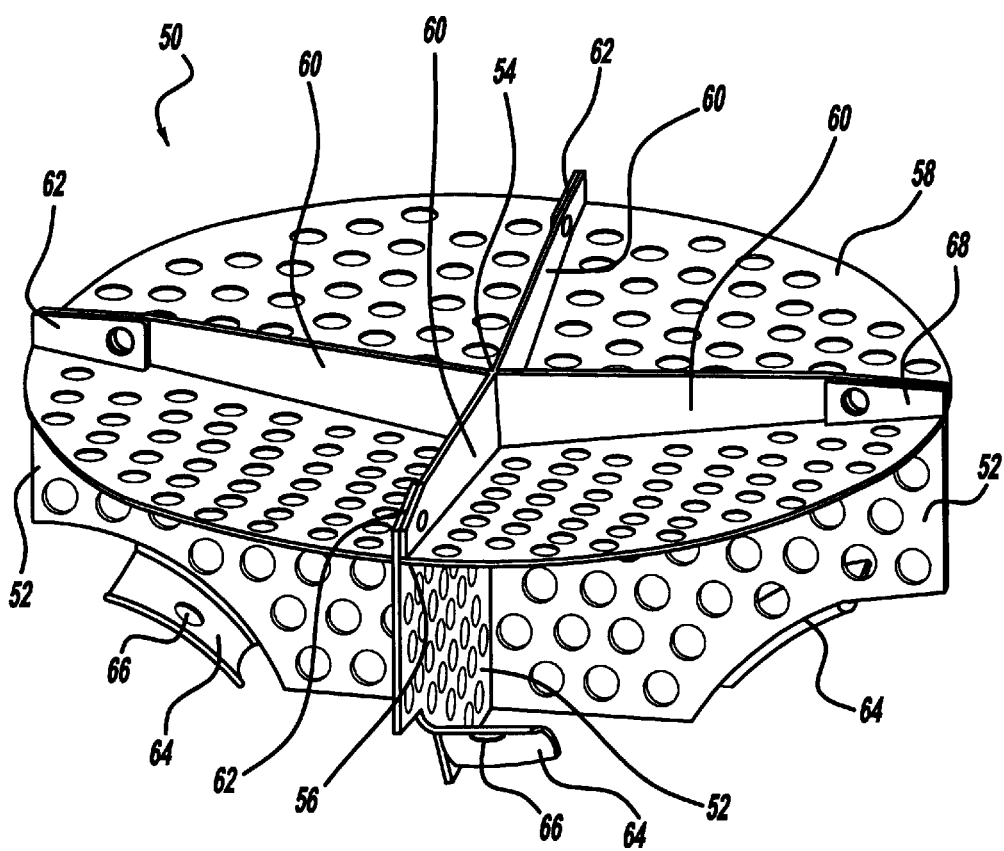
FIG. 6 is a perspective view of a liquid management device according to a second preferred embodiment of the present invention.

With reference to FIG. 6, on AVVIS 50 in accordance with a second preferred embodiment of the present invention is shown. The AVVIS 50 includes anti-vortex vanes 52 in a generally vertical orientation that intersect at an intersection area 54. Adjacent and affixed to the top edge 56 of each of the anti-vortex vanes 52 is a plate 58. Plate 58 has a cone shape substantially identical to the cone of plate 28 described in reference to the AVVIS 10 of the first embodiment. Bubble positioning vanes 60 extend above plate 58 and are substantially planar with anti-vortex vanes 52. Bubble positioning vanes 60 also intersect at the intersection area 54 but each is affixed to a respective tab 62 of one of the anti-vortex vanes 52 which extends through plate 58. Then a rivet or other interconnecting means connects each of the bubble positioning vanes 60 with its respective tab 62 through bore 63 to hold each of the bubble positioning vanes 60 in place. Additionally, tabs 64 are formed on a bottom portion of each of anti-vortex vanes 52 with a bore 66 formed in each mounting tab 64 to allow a screw or other fastening means to be used to affix AVVIS 50 to a sump. Anti-vortex vanes 52 and plate 58 contain bores substantially similar to bores 32 of AVVIS 10.

It is understood that the preferred embodiments described herein may be altered without departing from the scope of the present invention. AVVIS 10 or AVVIS 50 may be affixed to a sump 14 or a tank 12 by any number of suitable. The edges of the anti-vortexing vanes 24, 52 may themselves be directly affixed to the wall 18 of tank 12 without reducing the effectiveness of AVVIS 10 or AVVIS 50. Furthermore, the relative size of the plates 28, 58, anti-vortexing vanes, and the bubble positioning vanes 30, 60 may be adjusted to produce the most desirable effect depending upon the orientation and size of tank 12 into which they are placed. Furthermore, the overall size of AVVIS 10 or AVVIS 50 may be adapted for the particular tank into which it is to be placed to produce the optimum anti-vortexing and anti-vapor ingestion effect. It will also be understood that AVVIS 10 and AVVIS 50 are effective in environments that include gravity and those without gravity. In particular, the present invention is effective in reducing the vortex and vapor ingestion described herein as well as in wetting the plate, while in various gravity environments. AVVIS 10 and AVVIS 50 are also very helpful in respect to holding the liquid 42 near the sump 14 in low and no gravity environments.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of substantially reducing vapor ingestion into an outlet of a liquid storage tank during transport of a liquid from the liquid storage tank through the outlet, the method comprising:

limiting a formation of a vortex forming in a liquid by disposing a first member within an area of vortex formation near the outlet;

disposing a second member relative to an outlet to reduce friction forces of the liquid, thus limiting a dip formed in the liquid as the liquid exits the storage tank;

transporting a bubble along the second member to assist in eliminating vapor ingestion into the outlet;

forming said first member to include a first end and a second end;

forming said second member to generally define a cone having a vertex nearer said first end of said first member than said second end of said first member; and disposing a third member adjacent said second member on a side opposite said first member.

2. The method of claim 1, wherein limiting a vortex includes:

forming a plurality of bores in the first member, the plurality of bores serving to make the first member about 20 percent to about 40 percent porous.

3. The method of claim 1, wherein limiting a vortex includes disposing a first end of said first member substantially adjacent the outlet.

4. The method of claim 1, wherein a plane defined by said second member is substantially parallel to the outlet of the tank.

5. The method of claim 1, wherein disposing third member includes:

positioning said third member in a plane extending parallel to and through said first member.

6. The method of claim 1, further comprising:

wetting said second member through capillary forces of the liquid on a surface of said third member.

* * * * *